(12) United States Patent
Fellinger et al.

(45) Date of Patent: Sep. 16, 2008
(10) Patent No.: US 7,425,515 B2

(54) MULTILAYER REFLECTIVE INSULATION ROLL PRODUCT

(75) Inventors: Thomas J. Fellinger, Littleton, CO (US); Craig Sakata, Littleton, CO (US); Jeffrey D. Reinsma, Littleton, CO (US); John Brooks Smith, Centennial, CO (US); N. Douglass Fast, Littleton, CO (US); Marcus V. A. Bianchi, Littleton, CO (US); Anthony E. Moore, Glen Allen, VA (US)

(73) Assignee: Johns Manville, Denver, CO (US)

( * ) Notice: Subject to any disclaimer, the term of this patent is extended or adjusted under 35 U.S.C. 154(b) by 16 days.

(21) Appl. No.: 11/032,358

(22) Filed: Jan. 10, 2005

(65) Prior Publication Data
US 2006/0154115 A1 Jul. 13, 2006

(51) Int. Cl.
*B32B 29/00* (2006.01)
(52) U.S. Cl. .............. 442/34; 442/2; 442/33; 442/43; 442/45; 442/50; 442/57; 442/58; 428/457
(58) Field of Classification Search .......... 428/70, 428/71, 72, 74, 457; 442/2, 33, 34, 43, 45, 442/50, 57, 58
See application file for complete search history.

(56) References Cited

U.S. PATENT DOCUMENTS

| 5,231,814 | A | * | 8/1993 | Hageman | 52/408 |
| 5,918,436 | A | * | 7/1999 | Alderman | 52/407.3 |
| 6,627,561 | B1 | * | 9/2003 | Wulliman et al. | 442/1 |
| 6,811,852 | B2 | * | 11/2004 | Alderman | 428/69 |
| 2004/0185210 | A1 | * | 9/2004 | Fay et al. | 428/43 |

OTHER PUBLICATIONS

International Search Report for PCT/US06/00553, Dec. 14, 2006.

* cited by examiner

*Primary Examiner*—Andrew T Piziali
(74) *Attorney, Agent, or Firm*—Robert D. Touslee

(57) ABSTRACT

A multi-layer reflective insulation system for walls, ceilings, floors, roofs and similar applications includes a sheet of multi-layer reflective insulation from a roll product. The sheet of multi-layer reflective insulation is a laminate that includes first and second pliable sheet layers with reflective major surfaces and a separation media, intermediate opposed major surfaces of the first and second pliable sheet layers, that holds the first and second pliable sheet layers in a spaced apart relationship relative to each other. The separation media creates air space between the opposed major surfaces of the first and second pliable sheet layers for the enhanced reflection of incident radiation and the emission of radiation by a reflective surface of the product.

21 Claims, 6 Drawing Sheets

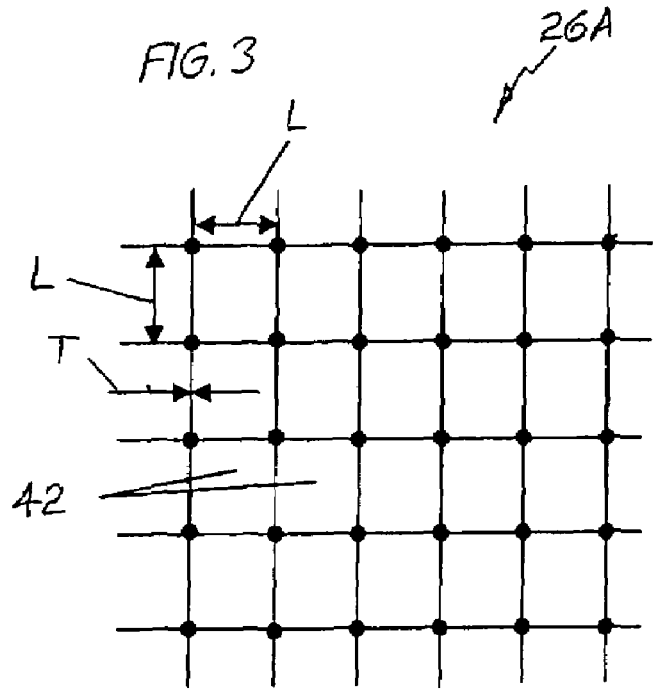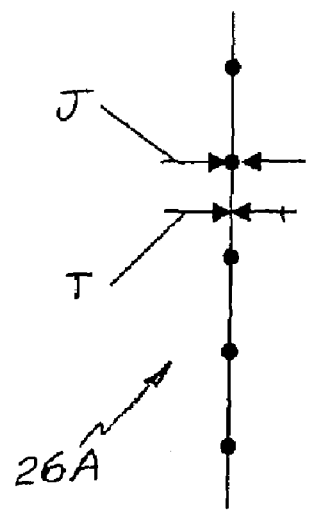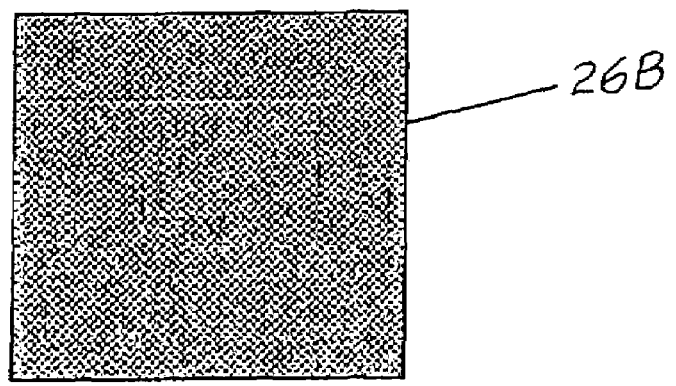

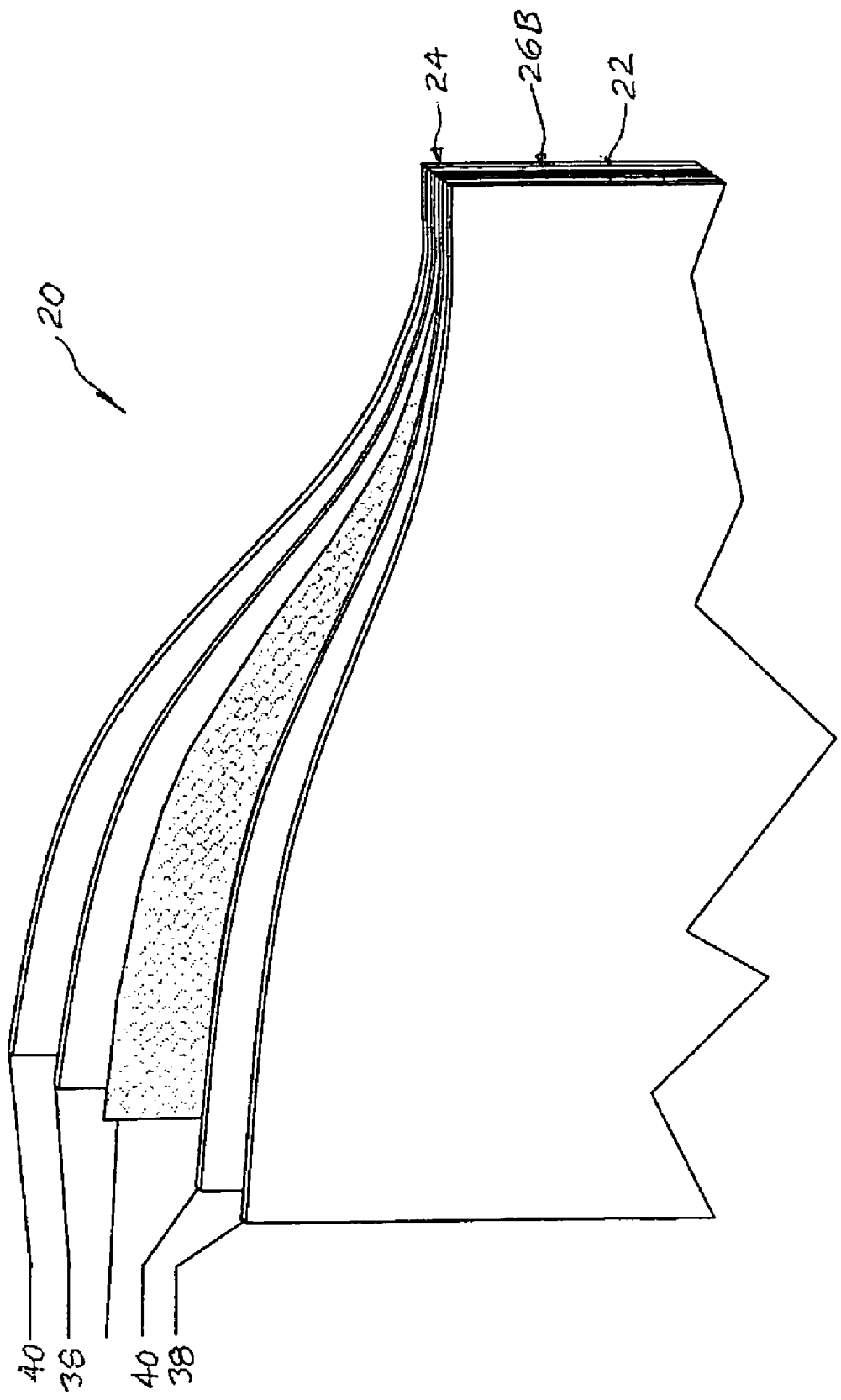

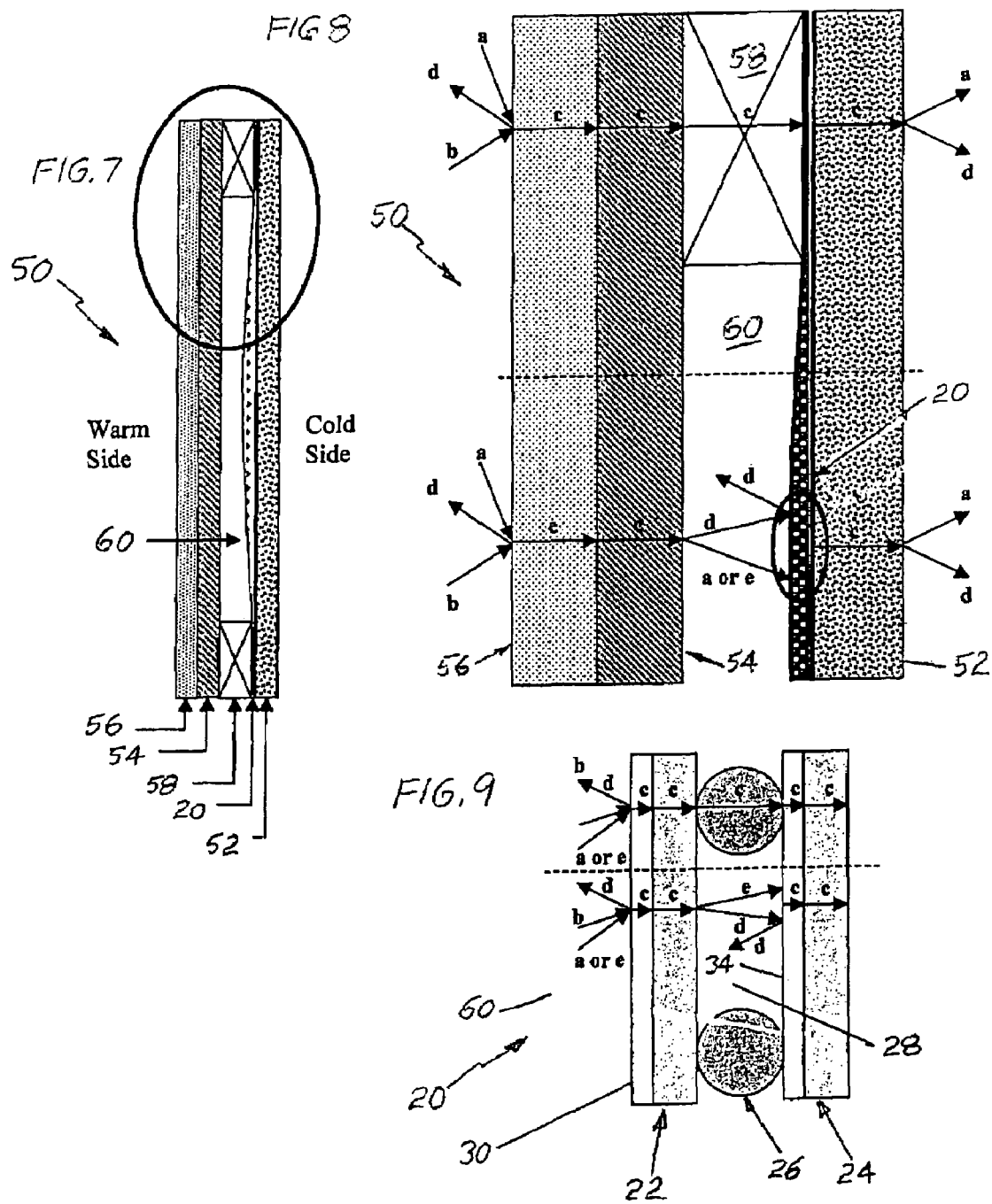

MULTILAYER REFLECTIVE INSULATION ROLL PRODUCT

BACKGROUND OF THE INVENTION

The subject invention relates to a multi-layer reflective insulation system and to a multi-layer reflective insulation roll product with air space separation media therein that is used in the multi-layer reflective insulation system. With its air space separation media, the multi-layer reflective insulation roll product of the subject invention requires no physical manipulation by the installer at the job site to activate the insulation roll product so that the product achieves its specified thermal performance.

Many manufacturers of reflective foil insulation systems provide multi-layer reflective insulation products that can be stapled onto the faces of the framing members forming the cavities of a building envelope. The radiant barrier facing material of U.S. Pat. No. 5,918,436 is an example of such a multi-layer reflective insulation product. These multi-layer insulation products are typically stapled onto the framing member faces in the same way that kraft paper faced fiberglass batt products are stapled in place. These multi-layer reflective insulation products have a plurality of reflective sheets, e.g. thin low emissivity aluminum foil sheets or thin low emissivity aluminum foil-kraft paper sheets. The reflective sheets of these multi-layer reflective insulation products have central field portions that are not bonded to each other and lateral edge portions that are bonded together to form the stapling flanges of the product. The stapling flanges of these products are typically formed by folding excess kraft paper back over itself at the lateral edges of the products so that a 1.0 inch to a 1.5 inch wide flange exists on each lengthwise edge of the product. The widths of the central field portions of the reflective sheets of these products differ from each other and typically some of the reflective sheets have folds therein so that the adjacent sheets of the product lay on each other for packaging and handling prior to installation. Since the existence of air spaces between the reflective sheets of these products plays a critical role in the ability of these systems to exhibit the claimed thermal performance (thermal resistance value or R-value), most of these products must be physically manipulated during the installation process by pulling on the stapling flanges or by shaking the products to separate the reflective layers so that one or more air spaces exist between the reflective layers. If the installers do not create the required air spaces between the reflective layers of these products to activate the products by physically manipulating the products during the installation process, thermal short-circuiting will exist between the reflective sheets of these products that reduce the ability of these products to reduce heat flow through the products. When applying these products to the framing members of building envelopes, the existence of non-standard cavity widths in the building envelopes poses another problem for the installers, which can reduce worker productivity and decrease the thermal performance of the products. Where the cavity widths to be insulated with these reflective insulation products are less than the standard width for such cavities and reflective insulation products, these multi-layer reflective insulation products may have to be cut lengthwise to reduce the widths of the products to approximate the widths of the cavities. Since many of these multi-layer reflective insulation products have paperboard tabs or folded pleats near the stapling flanges to aid in the physical manipulation and activation of the products at the job site, cutting away the activation mechanisms of these products to reduce their widths makes the physical manipulation and activation of these products time consuming and difficult if not impossible so that typically, either no air spaces are formed or air spaces are improperly formed between the reflective sheets of the products.

SUMMARY OF THE INVENTION

The multi-layer reflective insulation system of the subject invention solves the problems encountered with previous multi-layer reflective insulation systems by providing a multi-layer reflective insulation system, formed from a multi-layer reflective insulation roll product, wherein the reflective insulation roll product does not have to be physically manipulated and activated by the installer at the job site to achieve its rated thermal performance. The multi-layer reflective insulation roll product can be made in various widths and lengths: to accommodate various wall heights or other required application widths and lengths, to improve the application speed, to reduce the need to cut the product, to improve the versatility of the product, and to improve the overall appearance and thermal efficiency of the installed product. The multi-layer reflective insulation roll product of the subject invention can be quickly and easily applied over two, three or more cavity creating members, e.g. framing members, of a building structure (e.g. some or all of the framing members of an exterior or interior wall or ceiling, roof trusses, floor joists, etc.) or onto solid structures with furring strips or other cavity creating members (e.g. concrete or masonry walls with furring strips, concrete block walls with furring strips, garage doors with cavity creating members, etc.). Additionally, by using a mobile telescoping spool system or other means of material spooling, the installation of the multi-layer reflective insulation roll product of the subject invention could be a one-man operation. While the multi-layer reflective insulation roll product and system of the subject invention have many applications, the multi-layer reflective insulation roll product and system of the subject invention are especially well suited for insulating the cavities of a building envelope in warm and hot climates.

The multi-layer reflective insulation roll product of the subject invention is a laminate that includes first and second pliable reflective sheet layers and a separation media. The first and second pliable reflective sheet layers (e.g. foil/kraft paper laminates) each have at least one reflective major surface, which has low emissivity and high reflectivity (low absorptivity). These reflective major surfaces are typically formed from conductive materials with a shiny (semi-glossy to glossy), smooth flat surface such as a metal foil. The separation media is located intermediate the opposed major surfaces of the first and second pliable reflective sheet layers and holds the first and second pliable reflective sheet layers in a set spaced apart relationship relative to each other. The separation media creates an air space or air spaces between the opposed major surfaces of the first and second pliable reflective sheet layers. This air space or these air spaces enhance the reflection by the reflective major surface(s) of the reflective sheet layer(s) of incident radiation and the outward emission of radiant energy from within the product. By reflecting incident radiation away from the reflective surface(s) and emitting radiant energy from the reflective surface(s) back toward the warm side of the construction assembly, the overall heat transfer through the multi-layer insulation roll product is minimized.

The percentage of the surface areas of the opposed major surfaces of the first and second reflective sheet layers overlaid by and in contact with solid separation material of the separation media relative to the percentage of the surface areas of the opposed major surfaces of the first and second reflective sheet layers that are exposed to the open air space(s) and the opposing major surface of the first and second reflective sheet layers is minimized to the extent practical. This is for maximizing to the extent practical within the multi-layer reflective insulation roll product, the reflection of incident radiation by and the emission of radiation from the reflective surface(s) of the product and for minimizing to the extent practical within the multi-layer reflective insulation roll product, heat transfer by solid conduction through the solid separation material of the separation media. The percentage of the solid volume between the opposed surfaces of the first and second reflective sheet layers occupied by solid separation material of the separation media relative to percentage of the volume between of the first and second reflective sheet layers occupied by the air space is minimized to the extent practical. This too is for maximizing to the extent practical within the multi-layer reflective insulation roll product, the reflection of incident radiation by and the emission of radiation from the reflective surface(s) of the product and for minimizing to the extent practical within the multi-layer reflective insulation roll product, heat transfer by solid conduction through the solid separation material of the separation media.

BRIEF DESCRIPTION OF THE DRAWINGS

FIG. 3 is a schematic front view of netting used as the separation media in the multi-layer reflective insulation roll product of FIG. 2.

FIG. 4 is a schematic side view of the netting of FIG. 3.

FIG. 5 is a schematic perspective view of a typical construction of the multi-layer reflective insulation roll product of the subject invention, using a porous mesh as the separation media, with layers of the multi-layer reflective insulation roll product separated to better show underlying layers of the multi-layer reflective insulation roll product.

FIG. 6 is a schematic front view of a breathable fabric (open mesh) used as the separation media in the multi-layer reflective insulation roll product of FIG. 5.

FIG. 7 is a schematic horizontal cross section through an exterior wall of a building that includes a first multi-layer reflective insulation system of the subject invention wherein the multi-layer reflective insulation roll product is reduced in thickness at the framing members when installed.

FIG. 8 is an enlarged view of the circled portion of FIG. 7.

FIG. 9 is an enlarged view of the circled portions of FIGS. 8 and 10.

DESCRIPTION OF THE PREFERRED EMBODIMENTS

Figure 1:
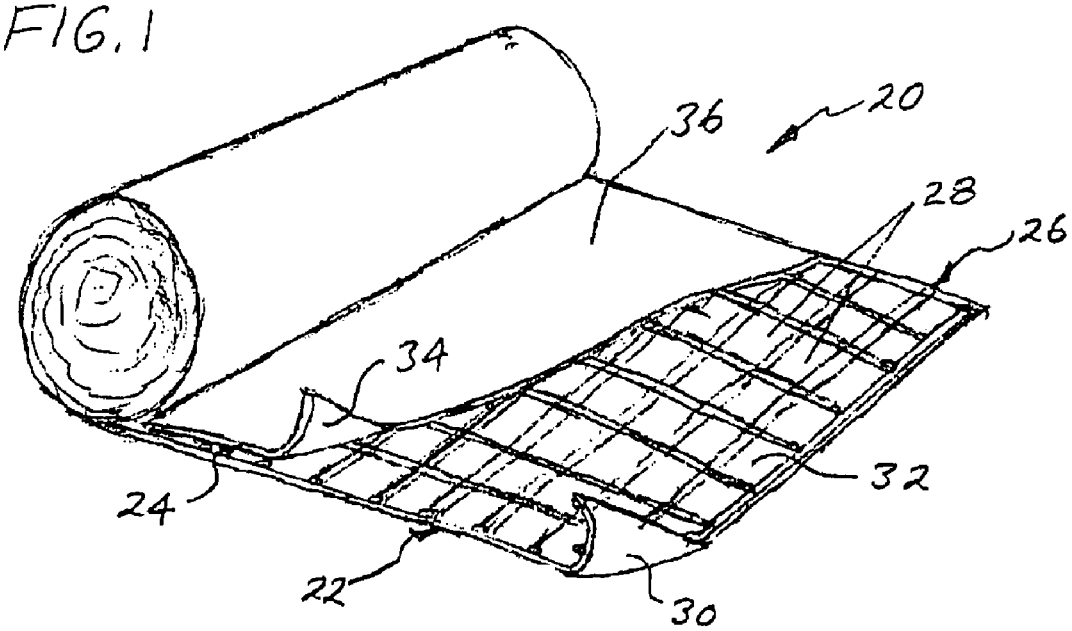
FIG. 1 is a schematic perspective view of a roll of the multi-layer reflective insulation roll product of the subject invention with portions of the product broken away and peeled back to better show underlying layers of the product.

FIG. 1 shows a multi-layer reflective insulation roll product 20 of the subject invention. The multi-layer insulation roll product 20 includes: a first pliable reflective sheet layer 22, a second pliable reflective sheet layer 24, and a separation media 26 intermediate opposed major surfaces of the first and second pliable reflective sheet layers that creates air space(s) 28 between the reflective sheet layers 22 and 24.

The first pliable reflective sheet layer of the multi-layer reflective insulation roll product 20 has a first major surface 30 and a second major surface 32 that are each defined by a length and a width of the first pliable reflective sheet layer. The first major surface 30 of the first pliable reflective sheet layer 22, which forms one side of the reflective insulation roll product 20, is a reflective surface that has low emissivity and high reflectivity. The second major surface 32 of the first pliable reflective sheet layer 22 overlays the separation media 26 and may be a reflective surface with low emissivity and high reflectivity or a non-reflective surface with high emissivity and low reflectivity.

When the multi-layer pliable reflective insulation roll product 20 is used to insulate cavities, the reflective insulation roll product is typically applied over one side of the cavities with the reflective first major surface 30 of the first pliable reflective sheet layer 22 facing the warm side of the cavities (facing the exterior of the construction assembly). Thus, when the multi-layer pliable reflective insulation roll product 20 is used to insulate building cavities, the reflective insulation roll product 20 is typically applied to the cool side of the cavities with the reflective first major surface 30 of the first pliable sheet layer 22 facing and overlying the cavity creating members (e.g. framing members or furring strips) creating the cavities. The types of building cavities typically insulated are wall, roof, ceiling, and floor cavities formed by framing members and cavities formed by furring or other strip materials on other surfaces to be insulated, such as but not limited to garage doors, concrete block walls, concrete or masonry walls, other concrete building slabs, etc.

The second pliable reflective sheet layer 24 of the multi-layer reflective insulation roll product 20 has a first major surface 34 and a second major surface 36 that are each defined by a length and a width of the second pliable reflective sheet layer. The first major surface 34 of the second pliable reflective sheet layer 24, which overlies the separation media 26, is a reflective surface that has low emissivity and high reflectivity. The second major surface 36 of the second pliable reflective sheet layer 24, forms a second side of the reflective insulation roll product 20, is adapted to face away from the cavities being insulated with the reflective insulation roll product 20, and may be a reflective surface with low emissivity and high reflectivity or a non-reflective surface with high emissivity and low reflectivity.

The first and second pliable reflective sheet layers 22 and 24 of the multi-layer reflective insulation roll product 20 are typically made of foil faced kraft paper sheet materials that have a first major surface with low emissivity and high reflectivity and a second major surface with a relatively high emissivity and low reflectivity. However, the pliable reflective sheet layers 22 and 24 may be made from foil sheet materials that have two major surfaces with low emissivity and high reflectivity, foil laminated to mesh, foil laminated to mold resistant facings, foil laminated to a flexible sheathing material, or other sheet materials or laminated sheet materials that provide at least one major surface with low emissivity and high reflectivity.

As used herein, a surface having a low emissivity is a surface that has an emissivity of 0.1 or less. Preferably, the low emissivity, high reflectivity major surfaces of the first and second pliable reflective sheet layers 22 and 24 have an emissivity of less than 0.07 and more preferably less than 0.045 with the emissivity of the low emissivity, high reflectivity major surfaces of the first and second pliable reflective sheet layers 22 and 24 typically being between about 0.02 and about 0.045. Either one or both of the pliable reflective sheet layers 22 and 24 may be sufficiently permeable to permit the passage of water vapor through the sheet layer(s) and the sheet layer(s) may be perforated to achieve the desired permeability. Either one or both of the pliable reflective sheet layers 22 and 24 may be impermeable to the passage of water vapor through the sheet layer.

The separation media 26 holds the second major surface 32 of the first pliable reflective sheet layer 22 and the reflective first major surface 34 of the second pliable reflective sheet layer 24 in a set spaced apart relationship relative to each other and creates air space(s) between the opposed major surfaces of the first and second pliable reflective sheet layers. The separation media 26 may be: netting (e.g. a polymeric, natural, or glass filament or fiber netting), a breathable fabric (mesh), a scrim a pattern or random pattern of spaced apart adhesive dots and/or linear beads, mastic dots and/or linear beads, or adhesive foam dots and/or linear beads; a pattern or random pattern of string, filaments, or adhesive foam, or a combination of two or more any of these separation media. As used herein, a linear bead does not have to be a straight linear bead.

The separation media 26 should be sufficiently crush-resistant to enable the multi-layer reflective insulation roll product 20 to be wound into a tight compact roll for packaging, storage, shipping, and handling prior to installation and to enable the multi-layer reflective insulation product 20 to handled during installation without crushing the media and bringing the opposed major surfaces of the reflective sheet layers 22 and 24 into contact with each other. In one embodiment of the multi-layer reflective roll product 20, the separation media 26 of the multi-layer reflective insulation roll product can be compressed, crushed, or partially compressed or crushed at the framing or other cavity creating members of the cavities being insulated with the product when sandwiched between the interior sheathing (such as, but not limited to wallboard or paneling) and the cavity creating members to which the interior sheathing is secured by conventional installation techniques, without reducing the spacing between the opposed major surfaces of the reflective sheet layers 22 and 24 to bring the opposed major surfaces of the reflective sheet layers into contact with each other in the spans between the cavity creating members. In another embodiment of the multi-layer reflective insulation roll product 20, the separation media 26 of the multi-layer reflective insulation roll product 20 is sufficiently compression or crush-resistant to enable the multi-layer reflective insulation roll product to be sandwiched between the framing or other cavity creating members of the cavities being insulated and interior sheathing (such as, but not limited to wallboard or paneling) secured to the cavity creating members by conventional installation techniques without compressing or crushing the separation media 26 to bring the opposed major surfaces of the reflective sheet layers 22 and 24 into contact with each other at the framing members.

Preferably, the solid material that comprises separation media 26 has a low conductivity to help decrease heat transfer through the multi-layer reflective insulation roll product 20 by solid conduction. The use of a separation media 26 made of a solid material that effectively absorbs or scatters thermal infrared radiation rather than a separation media made of a transmissive or opaque material with poor thermal infrared radiation absorption and scattering properties is also desirable.

The separation media 26 may bond the opposing major surfaces of the pliable reflective sheet layers 22 and 24 together in their spaced apart relationship or may be bonded to the spaced apart opposing major surfaces of the pliable reflective sheet layers 22 and 24 by a suitable adhesive, e.g. hot melt or other adhesives applied to the opposed major surfaces of the pliable reflective sheet layers. Examples of suitable separation media are low density woven or nonwoven mats; low-density scrims; open mesh nettings of polypropylene based, nylon based, polyethylene based, or other similar polymer based materials; and adhesives such as but not limited to conventional hot melt and foam adhesives.

The separation media 26 spaces apart the opposed major surfaces of first and second pliable sheet layers 22 and 24 a distance of about 0.25 inches or less; preferably about 0.19 inches or less; and more preferably about 0.06 inches or less. Typically, the separation media 26 spaces apart the opposed major surfaces of the first and second pliable sheet layers 22 and 24 a distance between about 0.01 inches and about 0.065 inches. A spacing between the opposed major surfaces of the reflective sheet layers 22 and 24 must be maintained to enable the reflective major surface of the reflective sheet layer 24 to reflect incident radiation and emit radiation.

The percentage of the surface areas of the opposed major surfaces of the first and second pliable reflective sheet layers 22 and 24 overlaid by and in contact with solid separation material of the separation media 26 relative to the percentage of the surface areas of the opposed major surfaces of the first and second pliable reflective sheet layers 22 and 24 exposed to the open air space and the opposing major surface of the other pliable reflective sheet layer should be minimized to the extent practical. This is for maximizing to the extent practical within the multi-layer reflective insulation roll product, the reflection of incident radiation by and the emission of radiation from the reflective surface 34 of the reflective sheet layer 24 and is also for minimizing to the extent practical within the multi-layer reflective insulation roll product, heat transfer by solid conduction through the solid separation material of the separation media 26. The surface areas of the opposed major surfaces of the first and second pliable sheet layers 22 and 24 overlaid by the solid separation material of the separation media 26 are each less than 50% and the surface areas of the opposed major surfaces of the first and second pliable sheet layers exposed to the air space and the opposing major surface of the other pliable sheet layer are each at least 50%. Preferably, the surface areas of the opposed major surfaces of the first and second pliable sheet layers 22 and 24 overlaid by the solid separation material of the separation media 26 are each less than 25% and the surface areas of the opposed major surfaces of the first and second pliable sheet layers exposed to the air space and opposing major surface of the other pliable sheet layer are each at least 75%. More preferably, the surface areas of the opposed major surfaces of the first and second pliable sheet layers 22 and 24 overlaid by the solid separation material of the separation media are each less than 10% and the surface areas of the opposed major surfaces of the first and second pliable sheet layers exposed to the air space and opposing major surface of the other pliable sheet layer are each at least 90%. Most preferably, the surface areas of the opposed major surfaces of the first and second pliable sheet layers 22 and 24 overlaid by the solid separation material of the separation media are each less than 5% and the surface areas of the opposed major surfaces of the first and second pliable sheet layers exposed to the air space and opposing major surface of the other pliable sheet layer are each at least 95% to 98%.

The percentage of the volume between the opposed surfaces of the first and second reflective sheet layers 22 and 24 occupied by the solid separation material of the separation media 26 (the solid material volume) relative to the percentage of the volume between the opposed surfaces of the first and second reflective sheet layers occupied by air space should also be minimized to the extent practical. This too is for maximizing to the extent practical within the multi-layer reflective insulation roll product, the reflection of incident radiation by and the emission of radiation from the reflective surface 34 of the reflective sheet layer 24 and is also for minimizing to the extent practical within the multi-layer reflective insulation roll product, heat transfer by solid conduction through the solid separation material of the separation media 26. The percentage of the volume between the opposed surfaces of the first and second reflective sheet layers 22 and 24 occupied by the solid separation material of the separation media 26 is less than 50% and the percentage of the volume between the opposed surfaces of the first and second reflective sheet layers occupied by air space is at least 50%. Preferably, the percentage of the volume between the opposed surfaces 32 and 34 of the first and second reflective sheet layers 22 and 24 occupied by the solid separation material of the separation media 26 is less than 25% and the percentage of the volume between the opposed surfaces of the first and second reflective sheet layers occupied by air space is at least 75%. More preferably, the percentage of the volume between the opposed surfaces 32 and 34 of the first and second reflective sheet layers 22 and 24 occupied by the solid separation material of the separation media 26 is less than 10% and the percentage of the volume between the opposed surfaces of the first and second reflective sheet layers occupied by air space is at least 90%. Most preferably, the percentage of the volume between the opposed surfaces 32 and 34 of the first and second reflective sheet layers 22 and 24 occupied by the solid separation material of the separation media 26 is less than 5% and the percentage of the volume between the opposed surfaces of the first and second reflective sheet layers occupied by air space is at least 95% to 98.5%.

The first and second pliable reflective sheet layers 22 and 24 and the separation media 26 form a multi-layer pliable reflective insulation laminate 20 that can be packaged, stored, transported, and handled prior to installation in roll form. While the multi-layer reflective insulation roll product 20 is shown with only two reflective sheet layers 22 and 24 and one separation media layer 26, it is contemplated that the multi-layer reflective insulation roll product of the subject invention could have one or more additional reflective sheet layers and one or more additional separation media layers. For example, the multi-layer reflective insulation roll product of the subject invention could have three reflective sheet layers separated by two separation media layers. The multi-layer reflective insulation roll product 20 can be made in various widths and lengths: to accommodate various wall heights or other required application widths and lengths; to improve the application speed; to reduce the need to cut the product; to improve the versatility of the product; and to improve the overall appearance and thermal efficiency of the installed product. While the multi-layer reflective insulation roll product 20 may be about 16 inches wide by about 8 feet long, a typical multi-layer reflective insulation roll product is about 3 to 4 feet or more in width and about 500 to 1000 feet or more in length. While the multi-layer reflective insulation roll product 20 can be used for many insulating applications, the multi-layer reflective insulation roll product 20 especially well suited for insulating the cavities of exterior building envelopes.

Figure 2:
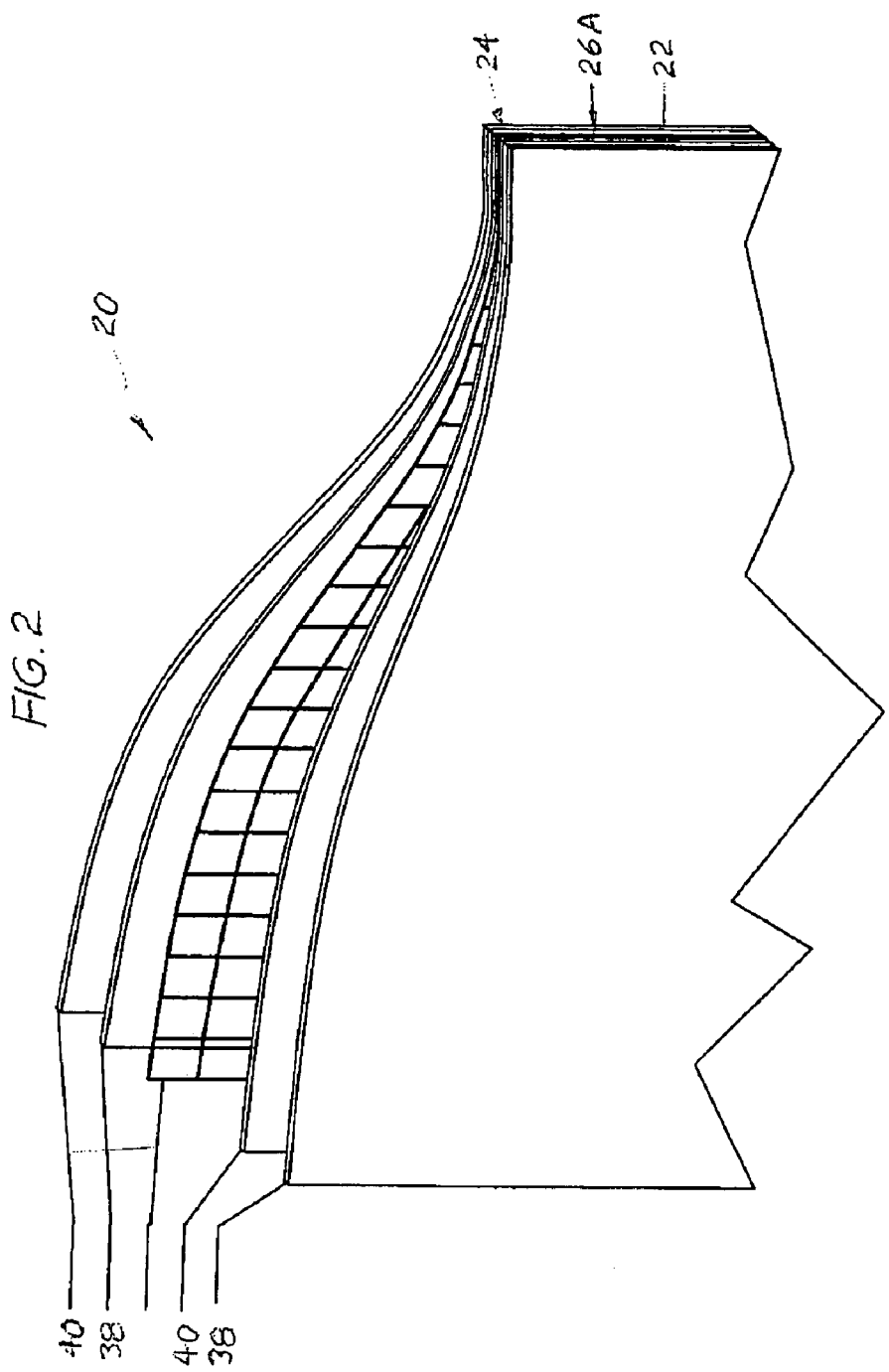
FIG. 2 is a schematic perspective view of a typical construction of the multi-layer reflective insulation roll product of the subject invention, using an open netting as the separation media, with layers of the multi-layer reflective insulation roll product separated to better show underlying layers of the multi-layer reflective insulation roll product.

FIG. 2 shows an embodiment of the multi-layer reflective insulation roll product 20 wherein the first and second reflective sheet layers 22 and 24 are laminates and the separation media 26 is open netting 26A. The first and second reflective sheet layers 22 and 24 each include an aluminum foil sheet 38 having low emissivity and high reflectivity and a kraft paper, backing sheet 40. The open netting separation media 26A shown in FIGS. 2, 3, and 4 typically has web dimensions "L" ranging between about 0.25 inches and about 2 inches and forms air spaces 42. The filaments forming the web are typically between 0.01 inches and 0.0625 inches in thickness "T" and the junctures "J" of the webs are typically between 0.015 inches and 0.065 inches in thickness. For netting separation media 26A made of webs having a thickness "T" of 0.01 inches and filament lengths "L" of 0.25 inches, the surface areas of the major surfaces of the reflective sheets layers 22 and 24 overlaid by the netting separation media are 10% and the surface areas of the major surfaces of the reflective sheet layers exposed to the opposing sheet layer are 90%. For netting separation media 26A made of webs having a thickness "T" of 0.01 inches and filament lengths "L" of 2.0 inches, the surface areas of the major surfaces of the reflective sheets layers 22 and 24 overlaid by the netting separation media are 2% and the surface areas of the major surfaces of the reflective sheet layers exposed to the opposing sheet layer are 98%. For netting separation media 26A made of webs having a thickness "T" of 0.01 inches and filament lengths "L" of 0.25 inches, the volume between the opposed major surfaces of the reflective sheets layers 22 and 24 occupied by the netting separation media is 7% and the volume between the opposed major surfaces of the reflective sheet layers occupied by air space is 93%. For netting separation media 26A made of webs having a thickness "T" of 0.01 inches and filament lengths "L" of 2.0 inches, the volume between the opposed major surfaces of the reflective sheets layers 22 and 24 occupied by the netting separation media is 1.6% and the volume between the opposed major surfaces of the reflective sheet layers occupied by air space is 98.4%. The open netting separation media 26A is typically made of polyester, glass, polypropylene, polyethylene, etc.

FIG. 5 shows an embodiment of the multi-layer reflective insulation roll product 20 wherein the first and second reflective sheet layers 22 and 24 are laminates and the separation media 26 is a breathable fabric (mesh) 26B. The first and second reflective sheet layers 22 and 24 each include an aluminum foil sheet 38 having low emissivity and high reflectivity and a kraft paper, backing sheet 40. The breathable fabric separation media 26B shown in FIGS. 5 and 6 typically has a weight of less than 0.7 ounces per square yard, an air permeability of greater than 1000 cu.ft./min./sq.ft. @ 0.5 inches water gauge, and a thickness between 0.01 inches and 0.0625 inches. The breathable fabric separation media 26B of FIGS. 5 and 6 has an open surface area between 50% and 75% and a closed surface area between 50% and 25%. The breathable fabric separation media 26B is typically made of polyester, glass, polypropylene, polyethylene, etc.

Multi-layer reflective insulation is typically used to insulate building envelopes in mild or hot climates where the exterior temperatures are normally higher than the interior temperatures of the building. While the multi-layer reflective insulation roll product 20 can be used in a reverse heat flow direction, the following summarizes the function of the multi-layer reflective insulation roll product 20 in a typical application where the reflective surfaces of the product face the normally warmer side of a building structure being insulated to reduce the transfer of thermal energy through the building structure from the normally warmer side to the normally cooler side of the building structure. With the reflective major surface 30 of the pliable reflective sheet layer 22 of the multi-layer reflective insulation facing and overlaying the wall, roof truss, ceiling, or floor cavities to be insulated, the reflective major surface 30 of the pliable reflective sheet layer 22 reflects a portion of incident radiation and emits radiation back into the cavities to reduce the overall transmission of thermal energy through the multi-layer reflective insulation 20. With the second major surface 32 of the first pliable reflective sheet layer 22 and first major surface 34 of the second pliable reflective sheet layer 24 being opposed to each other and overlaying the separation media 26, the separation media 26 holds or retains the second major surface 32 of the first pliable reflective sheet layer 22 and the first major surface 34 of the second pliable reflective sheet layer 24 in a set spaced apart relationship relative to each other and creates air space between the opposed major surfaces of the first and second pliable reflective sheet layers. With the reflective major surface 34 of the pliable reflective sheet layer 24 facing the air space created between the opposed major surfaces of the pliable reflective sheet layers by the separation media 26, the air space enhances the reflection of incident radiation by and the emission of radiation from the reflective major surface 34 of layer 24 within the product to minimize heat transfer through the multi-layer reflective insulation roll product by radiant heat transfer.

The percentage of the surface areas of the opposed major surfaces 32 and 34 of the first and second reflective sheet layers 22 and 24 overlaid by the solid separation material of the separation media 26 relative to the percentage of the surface areas of the opposed major surfaces of the first and second reflective sheet layers that are exposed to the air space and opposing major surface of the first and second reflective sheet layers is minimized to the extent practical to maximize the reflection of incident radiation by and the emission of radiation from the reflective major surface 34 of layer 24 within the product. The percentage of the volume between the opposed surfaces 32 and 34 of the first and second reflective sheet layers 22 and 24 occupied by the solid separation material of the separation media 26 relative to the percentage of the volume between of the first and second reflective sheet layers occupied by air space is minimized to the extent practical to maximize the reflection of incident radiation by and emission of radiation from the reflective major surface 34 within the product and minimize the heat transfer through the separation media 26 of the multi-layer reflective insulation roll product 20 by solid conduction.

FIGS. 7, 8 and 9 are schematic horizontal cross sections through an exterior wall 50 of a building that includes the multi-layer reflective insulation system of the subject invention and the reflective insulation roll product 20 used in the system. FIG. 8 illustrates heat transfer through the exterior wall 50. FIG. 9 illustrates heat transfer through the multi-layer reflective insulation roll product 20 insulating the exterior wall 50. In the illustrated heat transfer of FIGS. 8 and 9, "a" is convection (moving air); "b" is irradiation (reflected and emitted radiation from the surroundings); "c" is solid conduction; "d" is emitted and reflected radiation; and "e" is still air.

The interior sheathing or wallboard 52, the exterior sheathing 54, and the exterior siding 56 may be any of a number of sheathing and siding products typically used in an exterior wall. The stud framing members 58, between the multi-layer reflective insulation roll product 20 and the exterior sheathing 54 of the exterior wall 50, form air spaces 60 between the reflective insulation roll product 20 and the exterior sheathing 54. The multi-layer reflective insulation roll product 20 is located intermediate the interior sheathing 52 and the framing members 58 with the reflective major surface 30 of the pliable reflective sheet layer 22 facing outward to reflect incident radiation and emit radiation energy back into the air space 60 and the reflective major surface 34 of the pliable reflective sheet layer 24 facing outward to reflect incident radiation and emit radiation back into the air space(s) 28 formed within the multi-layer reflective insulation roll product by the separation media 26. The interior sheathing 52 is typically secured to the framing members 58 by conventional fastening techniques and with conventional mechanical fasteners. As shown in FIGS. 7 and 8, the separation media 26 of the multi-layer pliable reflective insulation roll product 20 is reduced in thickness (the separation media is crushed, partially crushed, compressed, partially compressed, etc.) at the stud framing members 58 of the cavities being insulated. However, while separation media 26 is reduced in thickness between the interior sheathing 52 (e.g. wallboard) and the stud framing members 58 to which the interior sheathing is secured, the separation media 26 in the spans between the framing members 58 is not reduced in thickness and the opposed major surfaces of the reflective sheet layers 22 and 24 are not brought into contact with each other in theses spans.

Due to the narrow thickness of the multi-layer reflective insulation roll product 20 and the reduction in thickness of the roll product of FIGS. 7 to 9, the multi-layer reflective insulation system of the subject invention does not appreciably increase the thickness of the wall, roof, ceiling, or floor structure in which the system is used and other components of the wall, roof, ceiling or floor structure do not have to be modified when using the system of the subject invention due to the increased thickness of the wall, roof, ceiling or floor structure. For example, when the multi-layer reflective insulation system of the subject invention is used in an exterior wall, standard size doorjambs and window frames can also be used in the wall.

Figure 10:
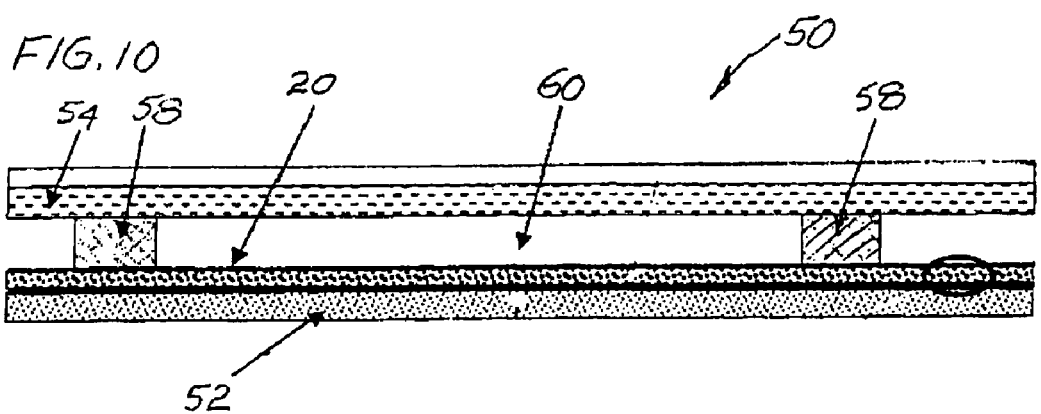
FIG. 10 is a schematic horizontal cross section through an exterior wall of a building that includes a second multi-layer reflective insulation system of the subject invention wherein the multi-layer reflective insulation roll product retains or substantially retains its initial thickness at the framing members when installed.

Due its narrow thickness, for certain applications, the multi-layer reflective insulation roll product 20 can be installed as shown in FIG. 10 without requiring any modification of other components of the wall, floor, ceiling, or roof structure. As shown in FIG. 10, the multi-layer reflective insulation roll product 20 is installed with no or substantially no reduction in the thickness of the product at the framing members 58. The separation media 26 of the multi-layer reflective insulation roll product 20 of FIG. 10 is made to withstand the compressive forces exerted on the roll product when the interior sheathing 52 is secured to the framing members 58 with no or substantially no reduction in the thickness of the product at the stud framing members 58. This structure retains the reflective sheet layers 24 and 26 of the multi-layer reflective roll product 20 in a spaced apart relationship and thus the roll product 20 functions to decouple the interior sheathing 52 from the stud framing members 58 to thermally and acoustically isolate the interior sheathing 52 from the remainder of the exterior wall 50.

Figure 11:
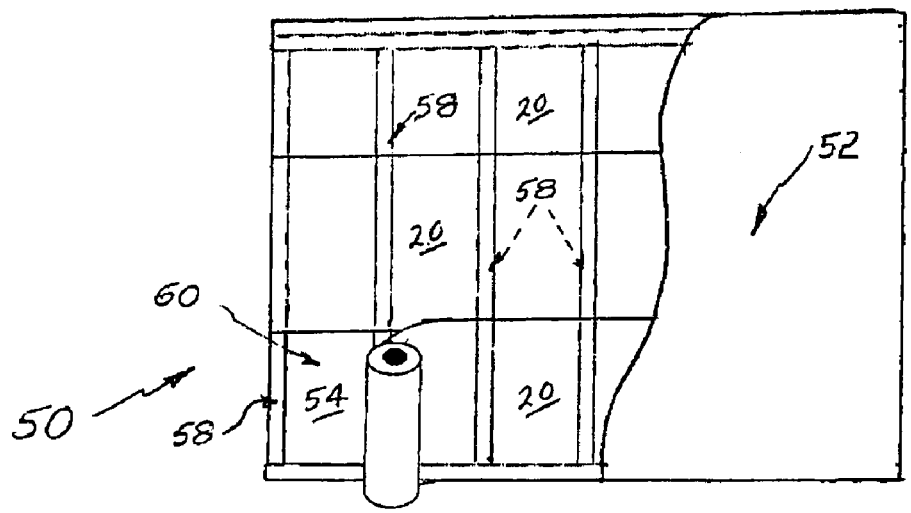
FIG. 11 is a schematic view of the interior side of the exterior walls of FIGS. 7 and 10, on a smaller scale, with part of the interior sheathing broken away and one of the sheets of the multi-layer reflective insulation roll product of the subject invention partially peeled back to show underlying layers of the wall structure.

FIG. 11 is a schematic view of the interior side of the exterior wall 50 of FIGS. 7 and 10 with part of the interior sheathing 52 (e.g. wallboard) broken away and one of the sheets of the multi-layer reflective insulation roll product 20 peeled back to show the underlying studs 58 and the exterior sheathing 54 of the wall. The multi-layer reflective insulation roll product 20 may be secured to the framing members or surface being insulated by conventional fastening means such as but not limited to adhesives, staples, etc. The multi-layer reflective insulation roll product 20 may be installed by extending the multi-layer reflective insulation roll product 20 lengthwise in a direction perpendicular to the lengths of the framing members as shown in FIG. 11 or the multi-layer reflective insulation roll product 20 may be installed by extending the multi-layer reflective insulation roll product 20 lengthwise in a direction parallel to the lengths of the framing members. Typically, the lateral edges of the adjacent reflective insulation roll products 20 forming an insulation system are overlapped and adhesively sealed together to form a vapor barrier.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A multi-layer reflective insulation roll product, consisting of:

a first foil kraft paper laminate having a first major surface and a second major surface that are each defined by a length and a width of the foil kraft paper laminate; the first major surface of the foil kraft paper laminate being a reflective foil surface having low emissivity; the second major surface of the first foil kraft paper laminate being a non-reflective kraft paper surface having high emissivity; a second foil kraft paper laminate having a first major surface and a second major surface that are each defined by a length and a width of the second foil kraft paper laminate; the first major surface of the second foil kraft paper laminate being a reflective foil surface having low emissivity; the second major surface of the second foil kraft paper laminate being a non-reflective kraft paper surface having high emissivity; the reflective first major surface of the first foil kraft paper laminate facing away from the second foil kraft paper laminate; the non-reflective second major surface of the first foil kraft paper laminate and the reflective first major surface of the second foil kraft paper laminate being located opposite and facing each other with only a separation media intermediate the opposed, facing major surfaces of the first and second foil kraft paper laminates; the separation media holding the first and second foil kraft paper laminates in a spaced apart relationship relative to each other and forming, with the first and second foil kraft paper laminates, a pliable reflective insulation laminate wherein the opposed major surfaces of the first and second foil kraft paper laminates are spaced apart a distance of 0.25 inches or less that is sufficient to create air space between the opposed major surfaces of the first and second foil kraft paper laminates to enable the reflective first major surface of the second foil kraft paper laminate to reflect incident radiation and emit radiation; the percentage of the surface areas of the opposed major surfaces of the first and second foil kraft paper laminates overlaid by solid separation material of the separation media each being 50% or less and the percentage of the surface areas of the opposed major surfaces of the first and second foil kraft paper laminates exposed to the opposing major surface of the other foil kraft paper laminate each being 50% or greater, and the pliable reflective insulation laminate being capable of being wound into a spiral roll form for handling prior to application.

2. The multi-layer reflective insulation roll product according to claim 1, wherein:
the reflective first major surfaces of the first and second foil kraft paper laminates each have an emissivity of 0.07 or less.

3. The multi-layer reflective insulation roll product according to claim 1, wherein:
the reflective first major surfaces of the first and second foil kraft paper laminates each have an emissivity of 0.045 or less.

4. The multi-layer reflective insulation roll product according to claim 1, wherein:
the reflective first major surfaces of the first and second foil kraft paper laminates each have an emissivity between about 0.02 and 0.045.

5. The multi-layer reflective insulation roll product according to claim 1, wherein:
the opposed major surfaces of the first and second foil kraft paper laminates are each spaced apart a distance of about 0.19 inches or less.

6. The multi-layer reflective insulation roll product according to claim 1, wherein:
the opposed major surfaces of the first and second foil kraft paper laminates are each spaced apart a distance of about 0.06 inches or less.

7. The multi-layer reflective insulation roll product according to claim 1, wherein:
the opposed major surfaces of the first and second foil kraft paper laminates are each spaced apart a distance between about 0.01 inches and about 0.06 inches.

8. The multi-layer reflective insulation roll product according to claim 1, wherein:
the percentage of the surface areas of the opposed major surfaces of the first and second foil kraft paper laminates overlaid by the solid separation material of the separation media are each 10% or less and the percentage of the surface areas of the opposed major surfaces of the first and second foil kraft paper laminates exposed to the opposing major surface of the other foil kraft paper laminate are each 90% or greater.

9. The multi-layer reflective insulation roll product according to claim 1, wherein:
the first and second foil kraft paper laminates are each at least three feet in width;
the opposed major surfaces of the first and second foil kraft paper laminates are each spaced apart a distance between about 0.01 inches and about 0.19 inches;
the percentage of the surface areas of the opposed major surfaces of the first and second foil kraft paper laminates overlaid by the solid separation material of the separation media are each 5% or less and the percentage of the surface areas of the opposed major surfaces of the first and second foil kraft paper laminates exposed to the opposing major surface of the other foil kraft paper laminate are each 95% or more; and the percentage of the volume between the opposing major surfaces of the first and second foil kraft paper laminates occupied by the solid separation material of the separation media is 5% or less and the percentage of the volume between the opposing major surfaces of the first and second foil kraft paper laminates occupied by air space is 95% or greater.

10. A multi-layer reflective insulation system, comprising:

a building structure with cavities; the cavities being defined in part by spaced apart cavity creating framing or furring strip members; and a sheet of multi-layer reflective insulation from a roll product overlaying and secured to the structure wherein the sheet of multi-layer reflective insulation consists of a first foil kraft paper laminate having a first major surface and a second major surface that are each defined by a length and a width of the first foil kraft paper laminate; the first major surface of the first foil kraft paper laminate overlaying the building envelope structure cavities; the first major surface of the first foil kraft paper laminate being a reflective foil surface having low emissivity; the second major surface of the first foil kraft paper laminate being a non-reflective kraft paper surface having high emissivity; a second foil kraft paper laminate having a first major surface and a second major surface that are each defined by a length and a width of the second foil kraft paper laminate; the first major surface of the second foil kraft paper laminate being a reflective foil surface having low emissivity; the second major surface of the second foil kraft paper laminate being a non-reflective kraft paper surface having high emissivity; the reflective first major surface of the first foil kraft paper laminate facing away from the second foil kraft paper laminate; the non-reflective second major surface of the first foil kraft paper laminate and the reflective first major surface of the second foil kraft paper laminate being located opposite and facing each other with only a separation media intermediate the opposed, facing major surfaces of the first and second foil kraft paper laminates; the separation media holding the first and second foil kraft paper laminates in a spaced apart relationship relative to each other and forming, with the first and second foil kraft paper laminates, a pliable reflective insulation laminate wherein the opposed major surfaces of the first and second foil kraft paper laminates are spaced apart a distance of 0.25 inches or less that is sufficient to create air space between the opposed major surfaces of the first and second foil kraft paper laminates to enable the reflective first major surface of the second foil kraft paper laminate to reflect incident radiation and emit radiation; the percentage of the surface areas of the opposed major surfaces of the first and second foil kraft paper laminates overlaid by the solid separation material of the separation media each being 50% or less and the percentage of the surface areas of the opposed major surfaces of the first and second foil kraft paper laminates exposed to the opposing major surface of the other foil kraft paper laminate each being 50% or greater.

11. The multi-layer reflective insulation system according to claim 10, wherein:

the reflective first major surfaces of the first and second foil kraft paper laminates each have an emissivity of 0.07 or less.

12. The multi-layer reflective insulation system according to claim 10, wherein:

the reflective first major surfaces of the first and second foil kraft paper laminates each have an emissivity of 0.045 or less.

13. The multi-layer reflective insulation system according to claim 10, wherein:

the reflective first major surfaces of the first and second foil kraft paper laminates each have an emissivity between about 0.02 and 0.045.

14. The multi-layer reflective insulation system according to claim 10, wherein:

the opposed major surfaces of the first and second foil kraft paper laminates are each spaced apart a distance of about 0.19 inches or less.

15. The multi-layer reflective insulation system according to claim 10, wherein:

the opposed major surfaces of the first and second foil kraft paper laminates are each spaced apart a distance of about 0.06 inches or less.

16. The multi-layer reflective insulation system according to claim 10, wherein:

the opposed major surfaces of the first and second foil kraft paper laminates are each spaced apart a distance between about 0.01 inches and about 0.06 inches.

17. The multi-layer reflective insulation system according to claim 10, wherein:

the percentage of the surface areas of the opposed major surfaces of the first and second foil kraft paper laminates overlaid by the solid separation material of the separation media are each 10% or less and the percentage of the surface areas of the opposed major surfaces of the first and second foil kraft paper laminates exposed to the opposing major surface of the other foil kraft paper laminate are each 90% or greater.

18. The multi-layer reflective insulation system according to claim 10, wherein:

the first and second are each at least three feet in width, the opposed major surfaces of the first and second foil kraft paper laminates are each spaced apart a distance between about 0.01 inches and about 0.19 inches;

the percentage of the surface areas of the opposed major surfaces of the first and second foil kraft paper laminates overlaid by the solid separation material of the separation media are each 5% or less and the percentage of the surface areas of the opposed major surfaces of the first and second foil kraft paper laminates exposed to the opposing major surface of the other foil kraft paper laminate are each 95% or greater; and the percentage of the volume between the opposing major surfaces of the first and second foil kraft paper laminates occupied by the solid separation material of the separation media is 5% or less and the percentage of the volume between the opposing major surfaces of the first and second foil kraft paper laminates occupied by the air space is 95% or greater.

19. The multi-layer reflective insulation system according to claim 10, wherein:

the sheet of multi-layer reflective insulation is secured to an interior side of the cavity creating members with the first major surface of the first foil kraft paper laminate overlaying the cavity creating members; and interior sheathing overlays the sheet of multi-layer reflective insulation and is secured to the interior side of the cavity creating members.

20. The multi-layer reflective insulation system according to claim 19, wherein:

the sheet of multi-layer reflective insulation functions to acoustically and thermally isolate the interior sheathing from the framing members.

21. The multi-layer reflective insulation system according to claim 19, wherein:

the sheet of multi-layer reflective insulation is reduced in thickness where the sheet of multi-layer reflective insulation overlays the cavity creating members while the opposed major surfaces of the first and second foil kraft paper laminates, intermediate the cavity creating members, are retained at the spaced apart distance.

* * * * *